Dec. 1, 1936.   C. W. RYERSON   2,062,612
TIRE COVER
Filed Aug. 1, 1933   3 Sheets-Sheet 1

INVENTOR
Creighton W. Ryerson
BY Ira J. Adams
ATTORNEY

Dec. 1, 1936.  C. W. RYERSON  2,062,612
TIRE COVER
Filed Aug. 1, 1933   3 Sheets-Sheet 2

INVENTOR
Creighton W. Ryerson
BY Ira J. Adams
ATTORNEY

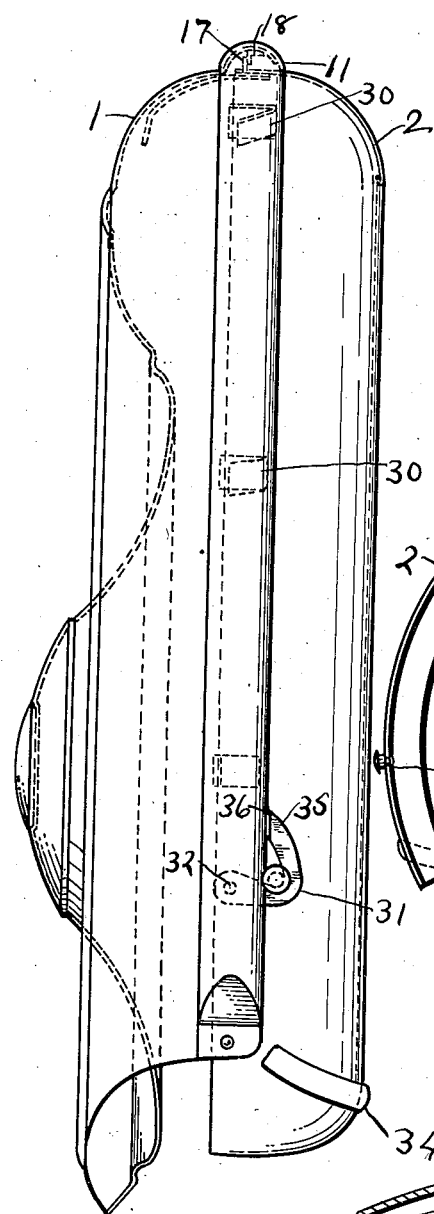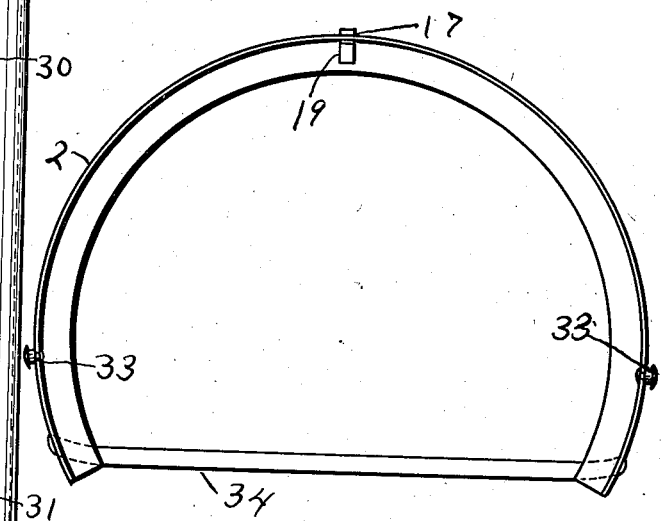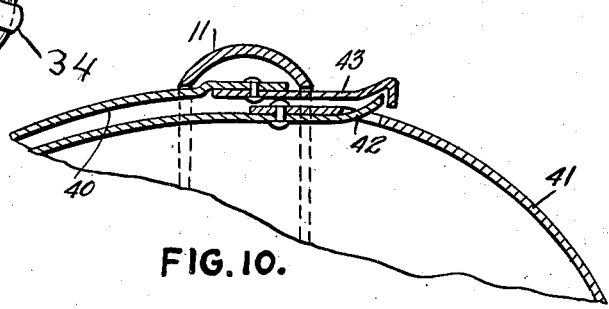

Patented Dec. 1, 1936

2,062,612

UNITED STATES PATENT OFFICE 2,062,612

TIRE COVER

Creighton W. Ryerson, Jackson, Mich., assignor to Ryerson & Haynes Inc., a corporation of Michigan Application August 1, 1933, Serial No. 683,191

6 Claims. (Cl. 150—54)

This invention relates to tire covers of the metal type.

An object of the invention is to construct a two piece tire cover where the two pieces engage the sides of the tire with latches to draw the two parts together while slightly springing one of the parts or the tire itself through its inherent resiliency.

Another object of the invention is to so construct the tire cover as previously described with sufficient clearance at the tread of the tire to permit the two parts to fit togther while resiliently compressing one or both parts against the sides of the tire.

Another object of the invention is to construct a hook on the rear back band so as to support the band on the tire mounted at the rear of an automobile while the front plate is being placed in position.

Another object of the invention is to construct a two piece tire cover with cushioning springs inside the center bead of the front plate to resiliently engage the rim of the back band when the two parts are assembled.

Another object of the invention is to construct the tire cover as previously mentioned in combination with latches and catches of improved form.

Another object of the invention is to construct the front plate with a cutaway portion at the bottom so that the front plate can be removed from a spare tire before dismounting the wheel from the bracket in installations where the rear bumper is closely adjacent to the lower part of the spare tire.

Another object of the invention is to construct a cut-off front plate with an integral hub disc at the center.

Other objects will appear in the appended description, reference being had to the drawings, in which:

Fig. 7 is a view of a cover with a modified form of latch with cut-off front plate and back band such as may be used in fender wheels.

Fig. 8 is an elevation of the back band viewed from the right in Fig. 7.

Fig. 9 is a perspective of the cushioning spring together with a portion of the center bead in the front plate.

Fig. 10 is a partial sectional view of a modified form of top hook and catch.

Figure 1:
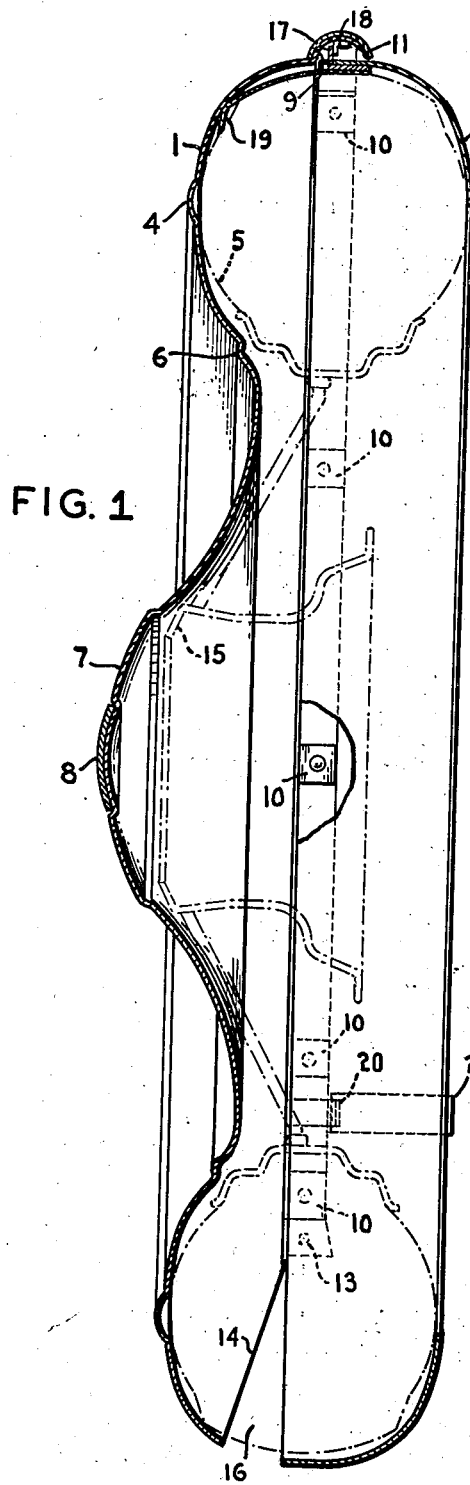
Fig. 1 is a sectional elevation of the tire cover mounted on a spare tire, portions of the tire and spare wheel being indicated by broken lines.
Figure 2:
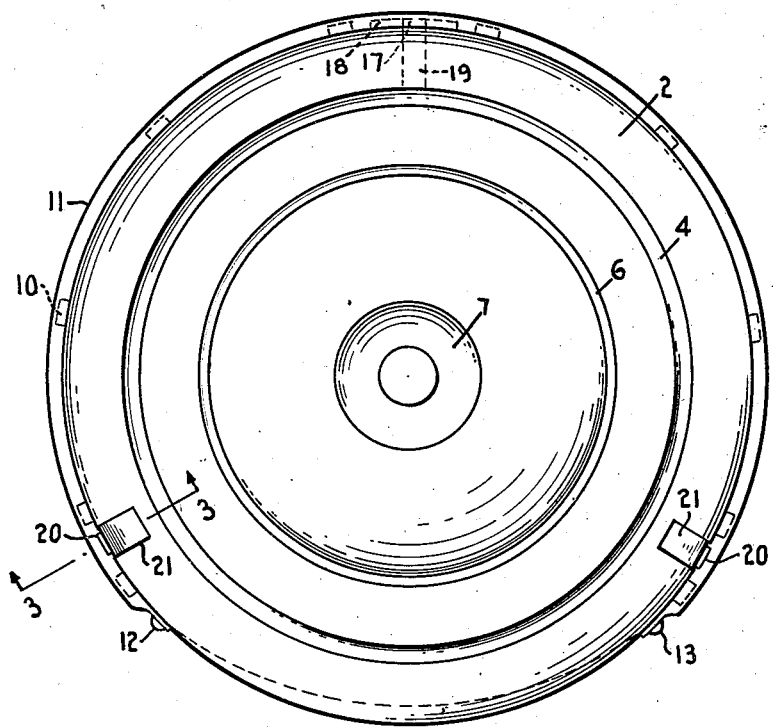
Fig. 2 is an elevation of Fig. 1 viewed from the left-hand side of that figure in the drawings.

Referring to Fig. 1, the tire cover consists of a front plate 1 and a back plate 2. The front plate is of general rounded contour and has an integral bead 4 substantially at the center of the tire 5 and another integral bead 6 adjacent the rim. The hub disc 7 is made integral with the rest of the front plate and has a monogram 8 for the particular make of automobile on which the tire cover is to be used. The front plate 1 is beaded at 9 substantially at the center of the tread of the tire and a plurality of cushion blocks 10 are riveted to this center bead. These blocks may be made of live rubber and the construction will be more clearly seen by referring to Fig. 3. A decorative bead 11 of stainless steel, or a bead plated, painted or enameled in any way desired, fits over the integral bead 9 of the front plate and is fastened thereto by appropriate fastening means. In the arrangement of Fig. 2 the bead is held in place by rivets 12, 13. The integral beads 4 and 6 may be burnished, painted, plated or decorated to contrast or harmonize with the rest of the tire cover as desired and these also may be displaced, if desired, by separable decorative beads held in place on the cover by any appropriate means.

The front plate 1 may have a portion of the bottom cut-off, as indicated at 14 so as to leave a gap 16 between the front plate and the back band. This is to enable the owner to remove the front plate while the wheel is mounted in position in installations having the rear bumper closely spaced from the bottom of the spare tire. In such cases the cut-off portion enables one to use the integral hub disc 7 which is a desirable feature on account of the reduction of expense. As will be seen, sufficient space may be left between the integral hub disc 7 and the end of the wheel hub 15 to permit one to carry an extra hub cap in the wheel whenever desired, though of course no hub cap is needed while the wheel is in position on the bracket and it is therefore not shown.

Figure 6:
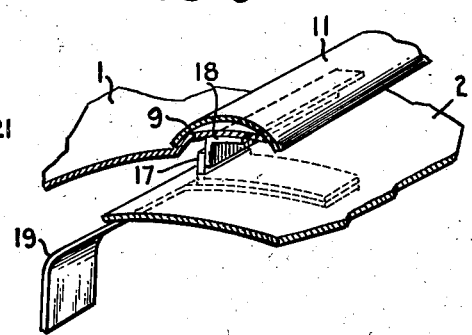
Fig. 6 is a perspective view of the catch of the back band in engagement with the abutment on the front plate together with the hook adapted to hold the back band on the tire during the assembling of the cover parts.

The rear back band 2 is a complete ring in the tire cover shown in Figs. 1 and 2 and it has a catch 17 indicated in Fig. 1 and shown in detail in Fig. 6, which engages a similar catch 18 fastened inside the bead of the front plate. In the form shown in Figs. 1 and 6 the catch 17 is spot welded to the back band 2 and to a retaining hook 19 (Fig. 6). The abutment 18 may be similarly spot welded to the tread bead 9 of the cover, though if desired, rivets could be used as they would be hidden from view by the decorative bead 11.

Only one catch 17 and abutment 18 is needed in the cover assembly and these are intended to be placed at the top of the wheel when the cover is assembled thereon.

A hooked keeper 20 is riveted or otherwise fastened beneath the center bead 9 of the front plate with the hooked portion sufficiently clearing the decorative bead 11 to permit the latch of the back band to engage therewith. In the form shown in Fig. 1 only two keepers are used and these are located below the center line of the cover as clearly indicated in Fig. 2. The cover thus has a three-point latch arrangement exerting pressure axially of the tire.

Figure 4:
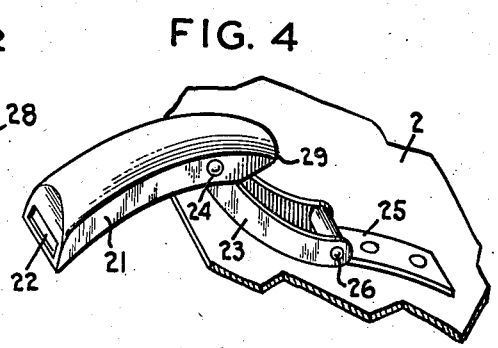
Fig. 4 is a perspective view of the latch and a portion of the back plate, the latch being in open position.
Figure 5:
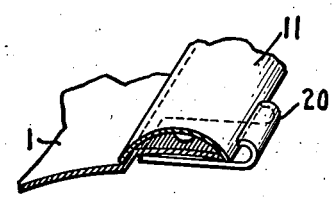
Fig. 5 is a perspective view of the latch keeper and a portion of the front plate.
Figure 3:
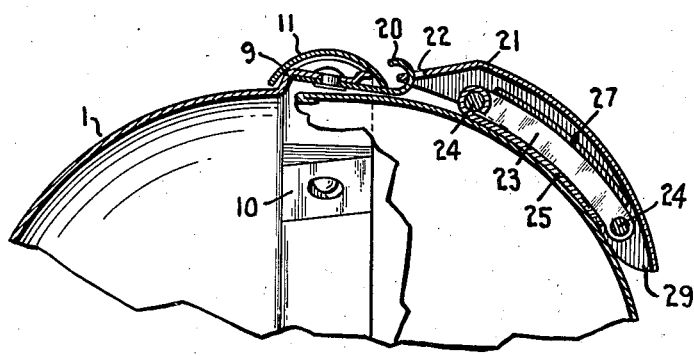
Fig. 3 is a section through one of the latches of Fig. 2, the latches in that figure being identical.

The latch on the back band that engages the keeper consists of a movable handle portion 21 having a slot 22 in the end to engage the hooked keeper (Figs. 3 and 4). This handle is somewhat boat shaped to house the link 23 pivoted thereto at 24, as well as the fulcrum strap 25 riveted or spot welded to the back band 2, the other end of the link 23 being pivoted at 26 to the fulcrum strap 25. The link 23 is of somewhat similar shape to the handle 21 except that the top piece 27 is cut away at the ends, as clearly indicated in Fig. 3.

To assemble the tire cover, the spare wheel and tire will be supposed to be mounted on a rear bracket (not shown). The back band, placed over the bracket before the spare wheel was mounted thereon, is raised into position and the hook 19 placed over the top of the tire. This holds the back band in place while the operator picks up the front plate 1. This gives the operator the use of both hands to manipulate the front plate. Also, the hook on the back band insures that the latter will not be accidentally released to damage the finish on the back of the automobile body while attempting to place the front plate in position. After the back band is hooked over the spare tire the operator will place the abutment 18 of the front plate 1 over the catch 17 on the back band, which is at the top of the tire, and then the slot 22 of the catch handle 21 is engaged with the hook member 2 while the catch is extended, as shown in Fig. 4. Pressure exerted on the handle 21 directed towards the rear of the tire cover will draw the bottom portion of the back band and front plate together, the top being held by the catch 17 and abutment 18. Before the latch is fully closed, as shown in Fig. 3, the front plate 1, which is resilient on account of its contour and the reduced thickness of the metal, yields sufficiently to enable the latch to be forced to position shown in Fig. 3. There is sufficient clearance between the front plate and the tire at all points except the center portion adjacent the bead 4 to allow of the yielding of the rim of the front plate to close the latch. The back band 2 preferably engages the tire only at the center line 28 though this is not necessary in all cases as the back band is usually made of stiffer material and its own resiliency is usually negligible. However, by giving clearance between the back band of the tire at all portions other than at the center line 28, the resiliency of the tire itself can be properly taken advantage of. In fact, by making both the back band and front plate of stiff non-resilient material one can still get the desired results through the resiliency of the tire itself when contact is made between both parts of the cover and the tire only at the center lines above referred to.

A cover constructed in this way is held tightly on the tire and is free from rattling noises during use and yet the cover can readily be placed in position by anyone without exerting any particular degree of strength or skill.

To remove the cover it is only necessary to insert the fingers under the tip 29 of both latches and a slight pull thereafter will loosen the catch by moving the handle to the position shown in Fig. 4. Due to the cut-off portion 14 of the front plate, the latter can be moved upwardly to free the catch members 17 and 18 at the top with only a slight movement of the bottom part away from the tire. The front plate can therefore be removed from the spare tire even with closely spaced rear bumpers and one may then by use of appropriate tools loosen the nuts or studs that hold the spare wheel to the bracket. It is therefore unnecessary to have the removable hub cap or hinge lid in the front plate 1.

In the modification of Figs. 7 and 8 the front plate 1 is cut off at the bottom as is also the back ring 2 for fender well covers.

Instead of rubber blocks I have shown a plurality of cushioning springs 30 riveted to the inside of the bead 9 of the front plate. The latching medium consists of a pair of hooks 31 pivoted at 32 to the inside of the bead 9. These hooks are adapted to engage the studs 33 riveted to the outside of the back band 2. The catch and abutment 18 of this figure are similar to those of Figure 1. The open ends of the back band are held together by a strap or rod 34 riveted or spot welded thereto.

In applying the cover of Figs. 7 and 8 the hook end 35 first engages the studs 33 and continued pressure applied to the hook forces the studs into the position shown in Fig. 7 and the upturned finger piece 36 against the edge of the bead 11. The seat for the stud is slightly recessed to cause the latched position to be stable.

I preferably make the hook 19 of spring material and fashion it to furnish part or even all the resiliency between the cover members at the top.

I also may locate the catch members 17, 18 behind and outside of the bead 10 so as to have it visible for ease in hooking the two parts of the top catch together.

These features are shown in Fig. 10 in which 40 indicates the spring hook which in this case exatends past the center of the tire side to furnish the resiliency between the two cover parts at the top. This hook extends through a slot in the back ring 41 where the protruding end 42 is engaged by the catch 43 fastened to the front plate and preferably located under the center bead as shown. This catch may be either on top of or under the peripheral edge of the front plate.

Having described my invention, what I claim is:

1. In a tire cover, a front member adapted to extend from the tread to the middle of the front side of a tire, a member adapted to extend from a point adjacent the first member to the middle of the rear side of said tire, a hook secured to one of said members, a lever pivoted at one end to the other member, a link pivoted to the other end of said lever and adapted to engage said hook to draw the same members toward each other, said members being constructed to engage the middle of the sides of the tire before said means completes its drawing action whereby the cover is resiliently held in place on the tire.

2. In a two part tire cover for a spare tire having a supporting bracket, a front plate, a back ring adapted to freely and loosely surround said bracket and a hook and catch secured to said ring at substantially the same point, said hook being adapted to support the ring on the tire at an upper part thereof and said catch adapted to engage the front plate and means to secure the front plate and back ring together at another point.

3. In a tire cover structure, a resilient metallic tire cover member adapted to extend from the tread to at least the front side of a tire, a second member, coacting latching mechanism associated with said member and adapted to draw one of said members toward the other, said mechanism including a lever type of latch carried by one of said members and having a fixed latched position, engageable means carried by the other of said members, said first member being constructed to engage the front side of the tire before said lever completes its drawing action and occupies its fixed latched position whereby said first member is resiliently held in place on the tire, said latch being characterized by the fact that said members when latched upon the tire always assume substantially the same relative position restricting application of the cover to tires of substantially the same size.

4. In a tire cover structure, a resilient metallic tire cover member adapted to extend from the tread to at least the front side of a tire, coacting latching mechanism associated with said members and a part adjacent thereto to draw said member against the tire, said mechanism including latch engageable means and a lever type of latch having a draw up action of fixed extent, said member being constructed to engage the front side of the tire before said lever completes its drawing action whereby said member is resiliently held in place on the tire, said latch being characterized by the fact that said members when latched upon the tire always assume substantially the same relative position restricting application of the cover to tires of substantially the same size.

5. In a cover structure for a spare wheel and tire assembly, a resilient metallic tire cover member, coacting latching mechanism associated with said member and a part adjacent thereto to draw said member against a part of said assembly, said mechanism including latch engageable means and a lever type of latch having a draw up action of fixed extent, said member being constructed to engage said part of said assembly before said lever completes its drawing action whereby said member is resiliently held in place on the tire, said latch being characterized by the fact that said members when latched upon the tire always assume substantially the same relative position restricting application of the cover to tires of substantially the same size.

6. In a tire cover, a front member adapted to extend from the tread to the middle of the front side of a tire, a member adapted to extend from a point adjacent the front member to the middle of the rear side of said tire, a lever type of latch having a fixed latched position, said latch being pivoted to one member, latch engageable means upon the other member with which said latch coacts to draw said members toward each other, said members being constructed to engage the middle of the sides of the tire before said latch completes its drawing action and occupies its fixed latched position whereby the cover is resiliently held in place on the tire, said latch being characterized by the fact that said members when latched upon the tire always assume substantially the same relative position restricting application of the cover to tires of substantially the same size.

CREIGHTON W. RYERSON.